United States Patent
Park

(10) Patent No.: US 9,868,338 B2
(45) Date of Patent: Jan. 16, 2018

(54) ELECTRIC DOOR CURTAIN FOR VEHICLE

(71) Applicant: Hyundai Motor Company, Seoul (KR)

(72) Inventor: Wan Su Park, Jeollanam-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/202,855

(22) Filed: Jul. 6, 2016

(65) Prior Publication Data

US 2017/0113518 A1    Apr. 27, 2017

(30) Foreign Application Priority Data

Oct. 21, 2015   (KR) .................. 10-2015-0146637

(51) Int. Cl.
   *B60J 1/20*   (2006.01)
   *B60J 5/00*   (2006.01)

(52) U.S. Cl.
   CPC ........... *B60J 1/2011* (2013.01); *B60J 1/2025* (2013.01); *B60J 1/2044* (2013.01); *B60J 1/2063* (2013.01); *B60J 1/2086* (2013.01); *B60J 5/00* (2013.01)

(58) Field of Classification Search
   CPC ..... B60J 1/2011; B60J 1/20; B60J 1/17; B60J 3/00; B60J 3/005; B60J 5/065; B60J 5/067; E06B 9/0692
   USPC ..................... 160/33, 37, 370.21, 370.22, 85
   See application file for complete search history.

(56) References Cited

U.S. PATENT DOCUMENTS

| | | | | |
|---|---|---|---|---|
| 303,088 | A * | 8/1884 | Whitaker | E06B 9/40 160/319 |
| 388,591 | A * | 8/1888 | Shaubach | B60J 1/2011 160/26 |
| 770,191 | A * | 9/1904 | Smith et al. | E06B 9/40 160/309 |
| 905,634 | A * | 12/1908 | Beahan | E06B 9/52 16/197 |
| 1,990,919 | A * | 2/1935 | Repetto | E06B 9/08 160/33 |
| 5,404,926 | A | 4/1995 | Ojima et al. | |

(Continued)

FOREIGN PATENT DOCUMENTS

| | | |
|---|---|---|
| JP | 2005-188208 A | 7/2005 |
| JP | 2008-081112 A | 4/2008 |

(Continued)

*Primary Examiner* — Blair M Johnson
(74) *Attorney, Agent, or Firm* — Mintz Levin Cohn Ferris Glovsky and Popeo, P.C.; Peter F. Corless

(57) ABSTRACT

An electric door curtain for a vehicle includes: guide rails disposed at both sides of a door panel of the vehicle; a curtain guide fixing shaft fixed to lower ends of the guide rails; a curtain moving shaft disposed over the curtain guide fixing shaft, coupled to the guide rails, and configured to move up and down; a motor equipped in the door panel, connected to the curtain moving shaft to supply power thereto, and supplying power to the curtain moving shaft to cause the curtain moving shaft to move up and down; a screen-type curtain with a lower end that is fixed to the curtain moving shaft and wound on the curtain guide fixing shaft and with an upper end that is connected to a curtain support bar; and a curtain tensioner disposed in a door glass frame at a top of the door panel, coupled to the curtain support bar, and pulling the screen-type curtain with a particular tension to keep the screen-type curtain taut.

10 Claims, 6 Drawing Sheets

(56) References Cited

U.S. PATENT DOCUMENTS

| | | | | |
|---|---|---|---|---|
| 5,469,662 | A * | 11/1995 | TenBrink | B60J 5/0413 49/349 |
| 5,785,105 | A * | 7/1998 | Crider | E06B 9/13 160/243 |
| 8,393,380 | B2 * | 3/2013 | Uehara | B60J 7/0015 160/313 |
| 8,960,261 | B1 * | 2/2015 | Williams | B60J 1/2025 160/370.22 |
| 2008/0017335 | A1 * | 1/2008 | Pohl | B60J 1/17 160/370.22 |
| 2008/0041540 | A1 * | 2/2008 | Li | B60J 1/2019 160/370.22 |
| 2009/0078379 | A1 * | 3/2009 | Hansen | B60J 1/2086 160/265 |

FOREIGN PATENT DOCUMENTS

| | | |
|---|---|---|
| KR | 10-0997248 B1 | 11/2010 |
| KR | 10-1064272 B1 | 9/2011 |

\* cited by examiner

ELECTRIC DOOR CURTAIN FOR VEHICLE

CROSS-REFERENCE TO RELATED APPLICATION

This application claims under 35 U.S.C. §119(a) the benefit of and priority to Korean Patent Application No. 10-2015-0146637 filed on Oct. 21, 2015, wherein the entire contents of which are incorporated herein by reference.

BACKGROUND (a) Technical Field

The present disclosure relates generally to an electric door curtain for a vehicle and, more particularly, to an electric door curtain for a vehicle that can automatically move up/down a curtain for covering a door glass using power from a motor and tension of a spring.

(b) Background Art

When rays of sunlight enter directly into a vehicle through its windows, during summer, for example, when daylight hours are long, the direct rays of sunlight increase the interior temperature of the vehicle and can impact the vision of passengers. In consideration of this problem, vehicles have been equipped with door glass curtains that attempt to block light from coming into the vehicles through the door glasses, that is, the windows installed in the vehicle doors.

Conventionally, door glass curtains are manual curtains that are rolled in a door panel to be pulled up and fixed to a fixing portion such as a hook on a door glass frame. Some more expensive vehicles have been equipped with roll-blind-type electric curtains, but there are many parts in such curtains, and the installation structure is complicated. In particular, tension of the curtains for covering door glasses is insufficient, and it is easily shaken by external force (for example, wind flowing into the vehicle when a door window is open). Consequently, the essential function of a curtain cannot be achieved.

The above information disclosed in this Background section is only for enhancement of understanding of the background of the disclosure, and therefore, it may contain information that does not form the related art that is already known to a person of ordinary skill in the art.

SUMMARY OF THE DISCLOSURE

The present disclosure has been made in an effort to solve the above-described problems.

An object of the present disclosure is to provide an electric door curtain for a vehicle that improves an electric curtain into a screen-type blind structure and can automatically move up/down a curtain for covering a door glass while applying predetermined tension to the curtain in order to maintain tension in the curtain and keep the curtain taut.

According to embodiments of the present disclosure, an electric door curtain for a vehicle includes: guide rails disposed at both sides of a door panel of the vehicle; a curtain guide fixing shaft fixed to lower ends of the guide rails; a curtain moving shaft disposed over the curtain guide fixing shaft, coupled to the guide rails, and configured to move up and down; a motor equipped in the door panel, connected to the curtain moving shaft to supply power thereto, and supplying power to the curtain moving shaft to cause the curtain moving shaft to move up and down; a screen-type curtain with a lower end that is fixed to the curtain moving shaft and wound on the curtain guide fixing shaft and with an upper end that is connected to a curtain support bar; and a curtain tensioner disposed in a door glass frame at a top of the door panel, coupled to the curtain support bar, and pulling the screen-type curtain with a particular tension to keep the screen-type curtain taut.

The electric door curtain can further include lifting blocks disposed on the curtain moving shaft and having guide holes formed therein. The lifting blocks may be integrally coupled to both ends of the curtain moving shaft, and the guide rails may be inserted into the guide holes of the lifting blocks.

The electric door curtain can further include: spring support ends integrally formed at predetermined positions on the guide rails; and moving shaft springs fitted on the guide rails between the spring support ends and the lifting blocks, the moving shaft springs configured to be compressed.

The electric door curtain can further include a wire having one end connected to the lifting blocks on the curtain moving shaft and another end connected to a rotary shaft of the motor, the wire configured to be rolled and unrolled.

The curtain tensioner may further include: a fixing pipe fixed in a top frame of the door glass frame; a rotary pipe rotatably disposed inside the fixing pipe; a spring disposed between the fixing pipe and the rotary pipe and generating elastic restoring force when the rotary pipe is rotated; a first pulley and a second pulley disposed at both ends, respectively, of the rotary pipe protruding through both open ends of the fixing pipe; and tension wires having upper ends connected to the first pulley and the second pulley, respectively, configured to be rolled and unrolled, and having lower ends connected to both ends of the curtain support bar configured to apply tension.

The first pulley and the second pulley may have respective diameters which differ from each other based on a height difference between front and rear sections of the top frame.

The electric door curtain may further include bearings rotatably supporting the rotary pipe disposed at both ends in the fixing pipe.

The tension wires may be made of a flexible material, disposed in vertical frames of the door glass frame, and configured to be moved up and down.

The electric door curtain may further include: a slide bar disposed at one or both sides of the curtain support bar and configured to be inserted and drawn out; and connection blocks connected to tension wires and to ends of the slide bar.

The connection blocks may be disposed in a vertical frame of the door glass frame and configured to be moved up and down, and guide holes for up-down movement of the slide bar may be formed through an inner side of the vertical frame.

Other aspects and embodiments of the disclosure are discussed infra.

BRIEF DESCRIPTION OF THE DRAWINGS

The above and other features of the present disclosure will now be described in detail with reference to particular exemplary embodiments thereof illustrated the accompanying drawings which are given hereinbelow by way of illustration only, and thus are not limitative of the present disclosure, and wherein.

Figure 1:
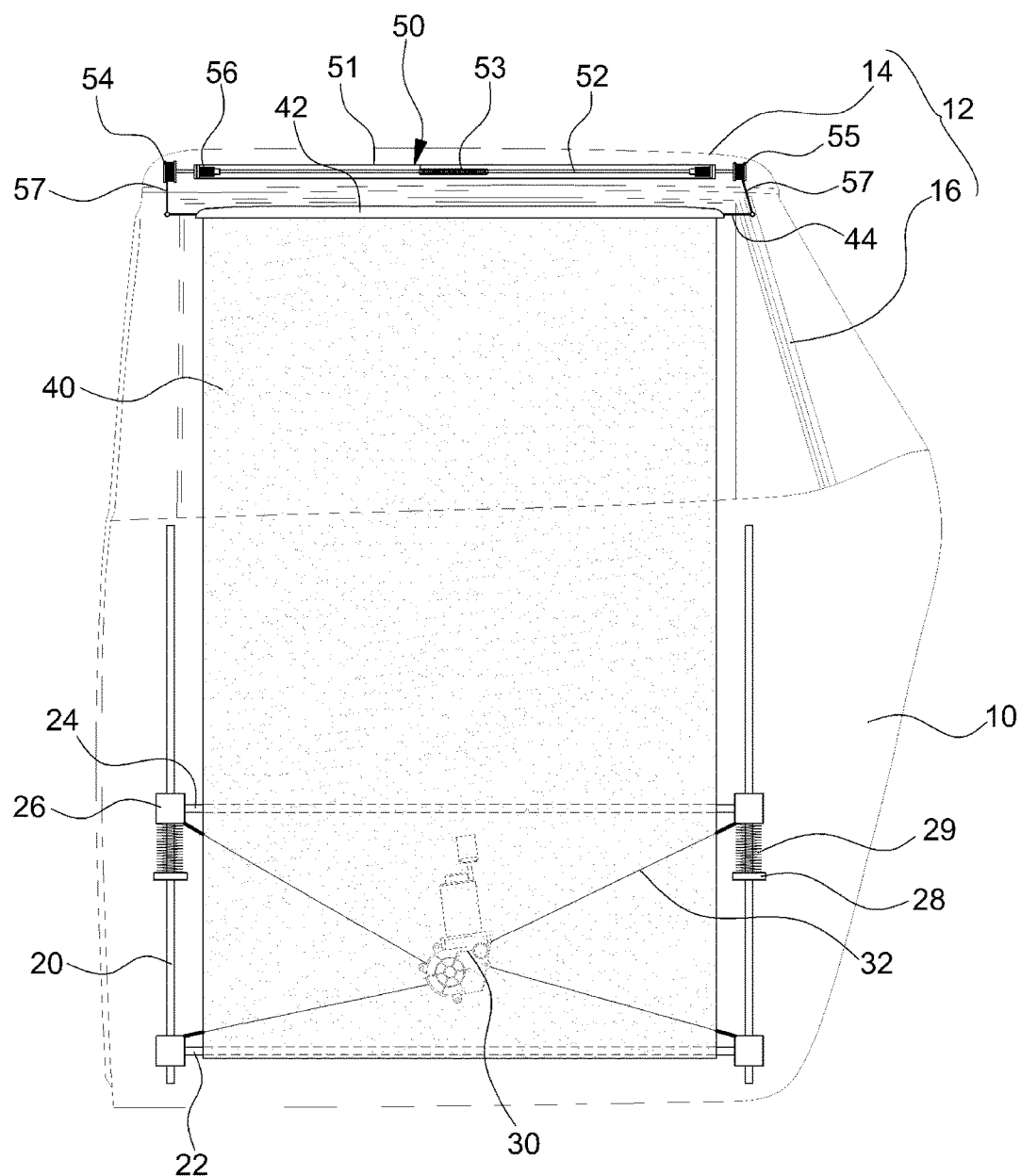
FIG. 1 is a cross-sectional view showing an electric door curtain for a vehicle and moving-up state of the curtain according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with embodiments, it will be understood that present description is not intended to limit the disclosure to those embodiments. On the contrary, the disclosure is intended to cover not only the described embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, embodiments of the present disclosure are described in detail with reference to the accompanying drawings.

Figure 2:
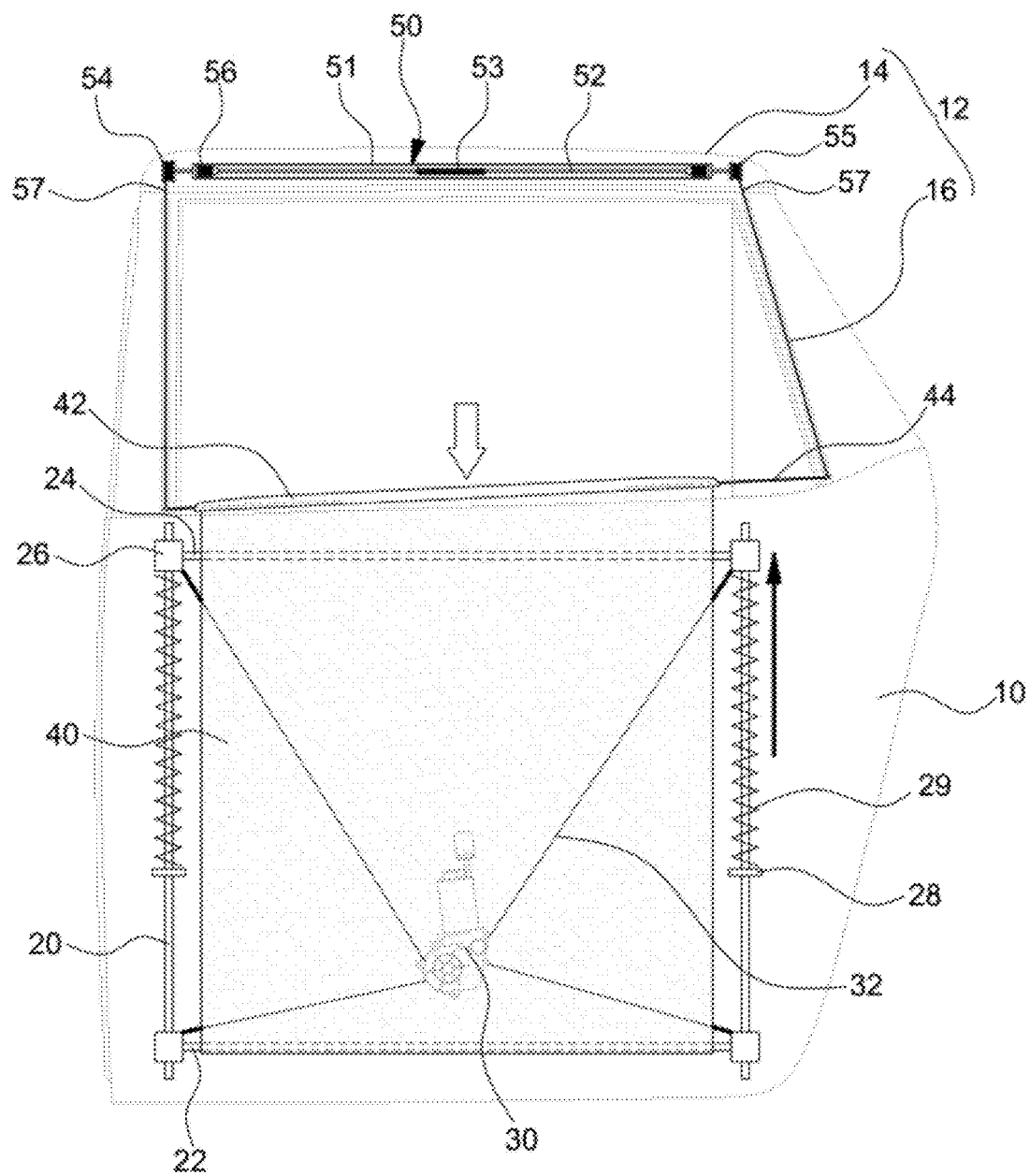
FIG. 2 is a cross-sectional view showing the electric door curtain for a vehicle and a moving-down state of the curtain according to the present disclosure.
Figure 3:
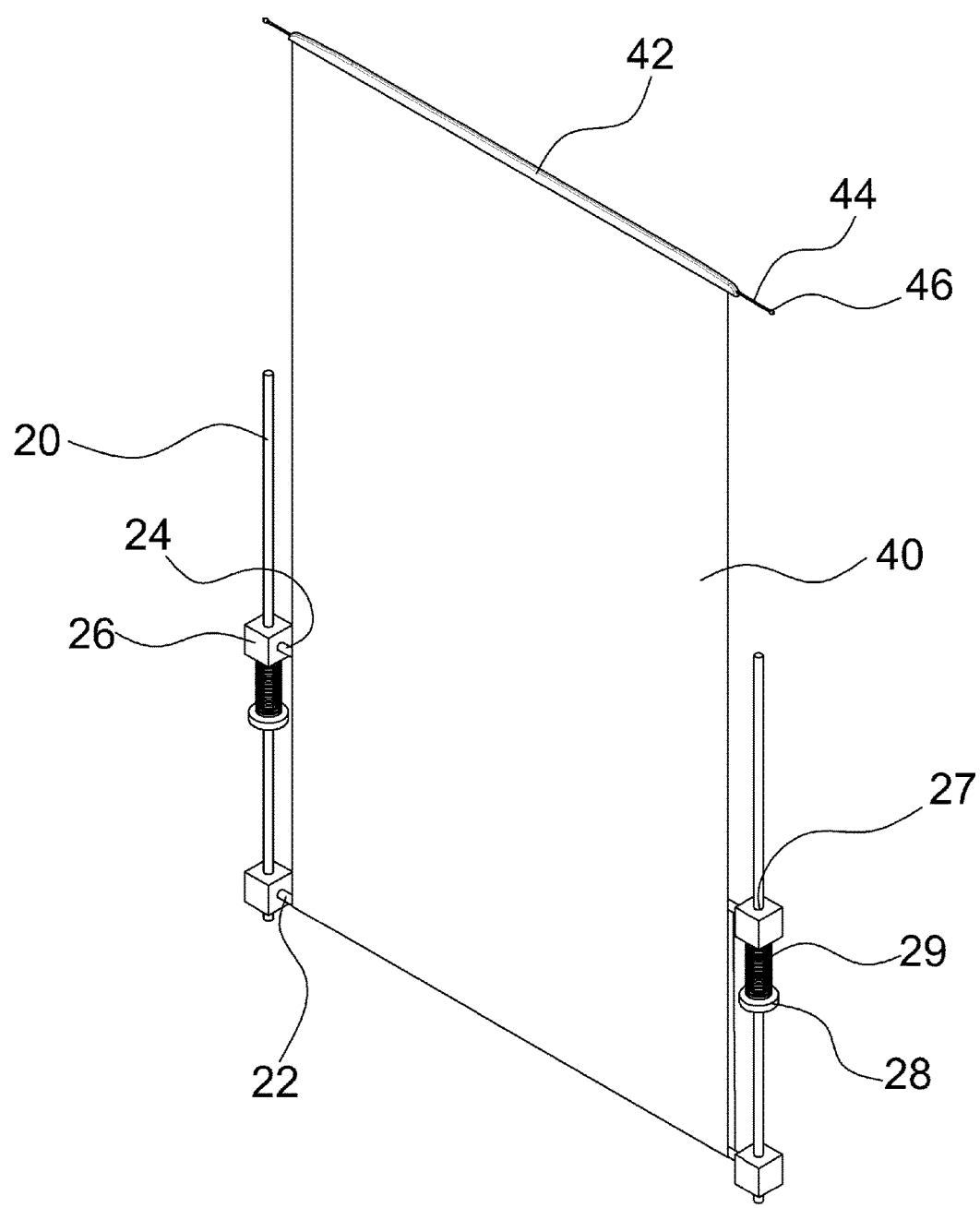
FIG. 3 is a perspective view showing a moving-up state of a screen-type curtain of the electric door curtain for a vehicle according to the present disclosure.
Figure 4:
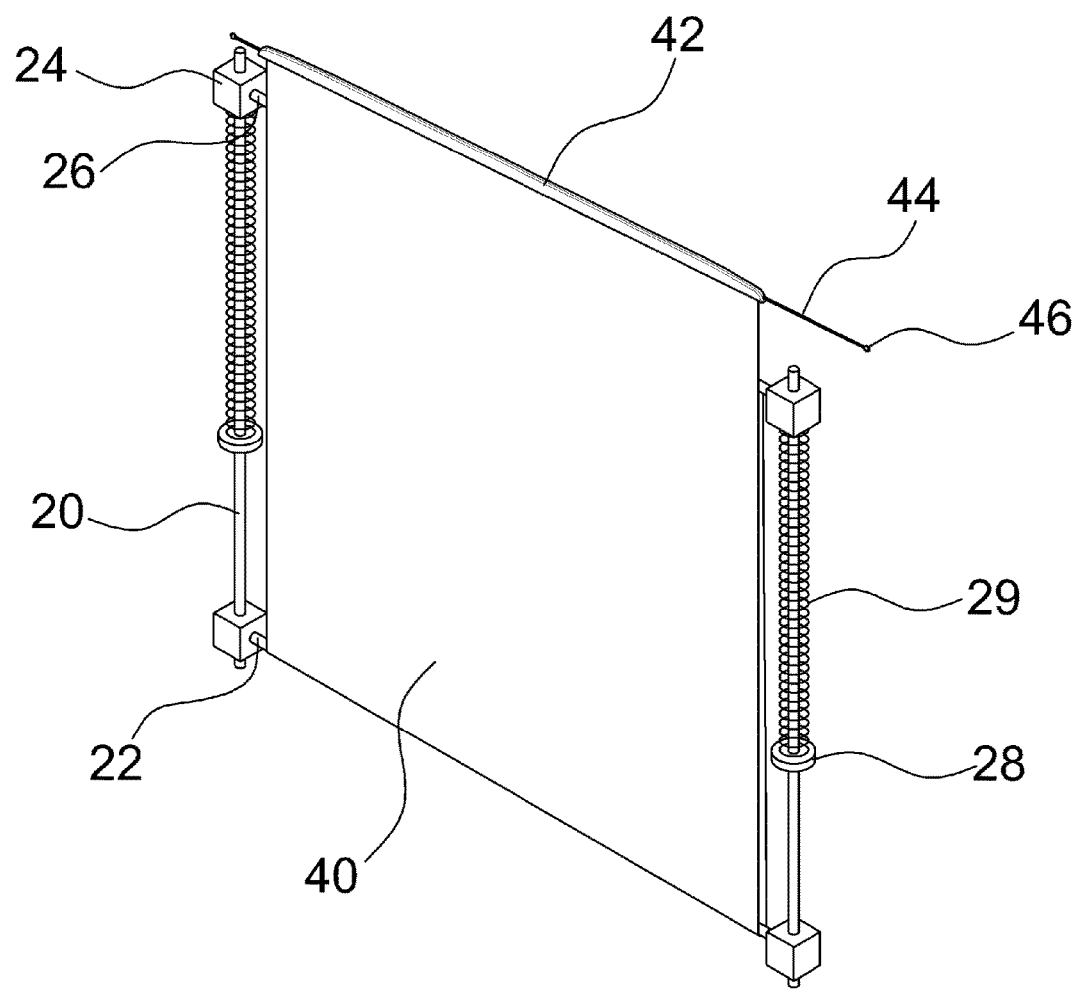
FIG. 4 is a perspective view showing a moving-down state of the screen-type curtain of the electric door curtain for a vehicle according to the present disclosure.

FIGS. 1 and 3 are views showing a moving-up state of an electric door curtain for a vehicle according to the present disclosure, and FIGS. 2 and 4 are views showing a moving-down state of the curtain for a vehicle according to the present disclosure.

In FIGS. 1 and 2, character reference '10' indicates a door panel, and character reference '12' indicates a door glass frame integrally formed at the top of the door panel. In general, when a power window switch is operated and a door glass (or door window) is moved down, the door glass is moved into a door panel, and when the door glass is moved up, the door glass contacts a door glass frame to be fitted with the frame.

In addition, circular rod-shaped guide rails 20 are fixed at both sides in the door panel 10 (both sides when the door panel is seen from the front). A curtain guide fixing shaft 22 is horizontally arranged and fixed in the longitudinal direction of a car body at the lower ends of the guide rails 20. Further, a curtain moving shaft 24 that can move up/down is coupled to the upper portions of the guide rails 20.

In this regard, lifting blocks 26 having a guide hole 27 formed up and down are integrally coupled to both ends of the curtain moving shaft 24 and the guide rails 20 are inserted in the guide holes 27 of the lifting blocks 26 such that the lifting blocks 26 can move up/down along the guide rails 20. Thus, when the lifting blocks 26 move up/down, the curtain moving shaft 24 moves up/down accordingly.

Spring support ends 28 are formed at predetermined positions on the guide rails 20, and compressible moving shaft springs 29 for moving the curtain moving shaft are disposed on the guide rails 20 between the tops of the spring support ends 28 and the bottoms of the lifting blocks 26.

The lower end of the screen-type curtain 40 is fixed to the curtain moving shaft 24, and the upper end of the screen-type curtain 40 is wound one time on the curtain guide fixing shaft 22 and connected to a curtain tensioner 50 on the door glass frame 12, as described below.

In detail, a curtain support bar 42 at the upper end of the screen-type curtain 40 is connected with the curtain tensioner 50, so the screen-type curtain 40 is kept taut by tension (i.e., an elastic restoring force of a spring) applied to the curtain tensioner 50, which will be described in further detail below.

A motor 30 for automatically moving up/down the screen-type curtain is disposed in the door panel 10. Further, ends of wires 32 are connected to the lifting block 26 on the curtain moving shaft 24, and the other ends of the wires 32 are connected to the rotary shaft of the motor 30 to be rolled and unrolled.

When the motor 30 is operated forward, the wires 32 are wound on the rotary shaft of the motor and pull down the lifting blocks 26, so the lifting blocks 26 compress the moving shaft springs 29 and move down along the guide rails 20, and the curtain moving shaft 24 also moves down. Further, the screen-type curtain 40 is moved to a position where a door glass is covered by the tension (i.e., elastic restoring force of a spring) applied by the curtain tensioner 50.

In contrast, when the motor 30 is operated backward, the wires 32 are unrolled from the rotary shaft of the motor, and the moving shaft springs 29 apply elastic restoring force larger than the tension by the curtain tensioner 50 to the lifting blocks 26, so the lifting blocks 26 are moved up, and the curtain moving shaft 24 is also moved up along the guide rails 20. Further, the screen-type curtain 40 is also moved down to the initial position (in the door panel).

Figure 5:
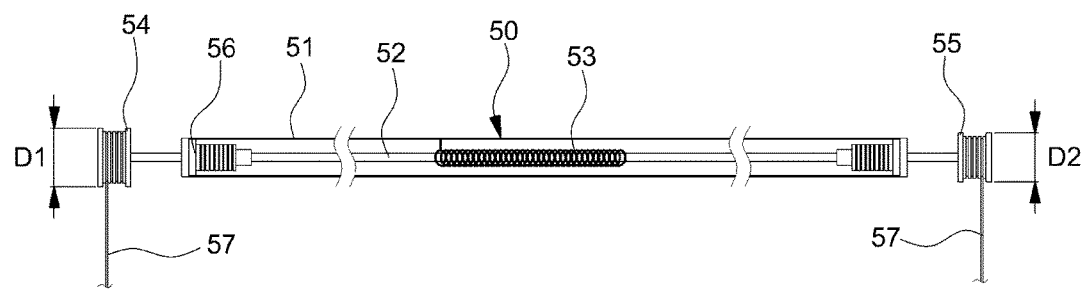
FIG. 5 is a cross-sectional view showing a curtain tensioner of the electric door curtain for a vehicle according to the present disclosure.

The configuration of the curtain tensioner is described hereafter in detail with reference to FIG. 5.

The curtain tensioner 50 is disposed in a top frame 14 of the door glass frame 12 formed at the top of the door panel 10 to pull the screen-type curtain 40 with predetermined, particular tension in order to keep the curtain 40 taut. In the curtain tensioner 50, a hollow fixing pipe 51 is fixed in the top frame 14 of the door glass frame 12, and a rotary pipe 52 is rotatably disposed in the fixing pipe 51. Further, a spring 53, which generates elastic restoring force when the rotary pipe 52 is rotated, is disposed between the inner side of the fixing pipe 51 and the outer side of the rotary pipe 52.

Both ends of the rotary pipe 52 protrude outside through both open ends of the inside the fixing pipe 51, and a first pulley 54 and a second pulley 55 are coupled to both ends of the rotary pipe 52, respectively. Bearings 56 rotatably supporting the rotary pipe 52 may be disposed at both ends inside the fixing pipe 51.

In addition, tension wires 57 are connected to the first pulley 54 and the second pulley 55 to be rolled and unrolled, and the lower ends of the tension wires 57 are connected to the curtain support bar 42 supporting the screen-type curtain 40. Preferably, the tension wires 57 are made of a flexible material and disposed in the vertical frames 16 of the door glass frame 12 to be moved up/down.

The first pulley 54 and the second pulley 55 have different diameters from each other based on the height difference between the front and the rear of the top frame 14 in order to obtain a difference between the length of the tension wire 57 unrolled from the first pulley 54 and the length of the tension wire 57 unrolled from the second pulley 55. For example, if the first pulley 54 is positioned higher than the second pulley 55 in the top frame 14 and the same diameter is given to the first pulley 54 and the second pulley 55, the lengths of the tension wires 57 unrolled from the pulleys 54 and 55 are the same, the screen-type curtain is unbalanced at the front and the rear.

Accordingly, by positioning the first pulley 54 higher than the second pulley 55 in the top frame 14 and giving a large diameter to the first pulley 54 as compared with the second pulley 55, so that the length of the tension wire 57 unrolled from the first pulley 54 is shorter than the length of the tension wire 57 unrolled from the second pulley 55, the screen-type curtain can be balanced at the front and the rear.

Figure 6:
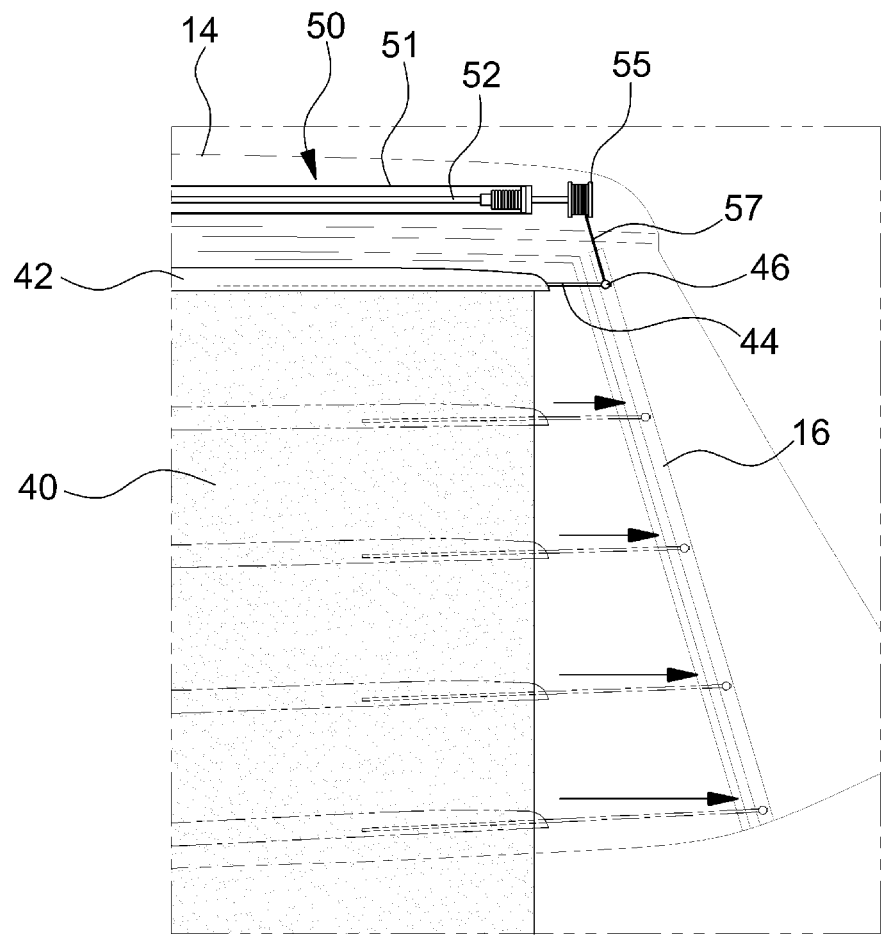
FIG. 6 is a cross-sectional view showing a coupling relationship between the curtain tensioner and the screen-type curtain of the electric door curtain for a vehicle according to the present disclosure.

The screen-type curtain 40 can have a uniform width, but the vertical frame 16 of the door glass frame 12 is vertically inclined, so, as shown in FIG. 6, the curtain support bar 42 at the top of the screen-type curtain 40 and the tension wires 57 in the vertical frame 16 should be connected so that the length can be adjusted.

To this end, a slide bar 44 is disposed at a side or both sides of the curtain support bar 42 to be inserted and drawn out and connection blocks 46 connected with the tension wires 57 are coupled to the ends of the slide bar 44. The connection blocks 46 connected to the slide bar 44 are disposed in the vertical frame 16 of the door glass frame to be moved up/down and guide holes (not shown) for up-down movement of the slide bar 44 are formed through the inner side of the vertical frame 16.

Accordingly, as shown in FIG. 6, when the distance between the curtain support bar 42 and the vertical frame 16 is relatively large, the slide bar 44 is drawn out of the curtain support bar 42, and when the distance between the curtain support bar 42 and the vertical frame 16 is relatively small, the slide bar 44 is inserted in the curtain support bar 42, so the screen-type curtain 40 and the curtain support bar 42 can be smoothly moved up/down.

The operational flow of the electric door curtain of the present disclosure having the configuration described above is described with reference to FIGS. 1 to 4.

Moving-Up of Screen-Type Curtain

When the screen-type curtain 40 is moved down and then put on the door panel 10, the rotary pipe 52 of the curtain tensioner 50 is rotated in a predetermined direction, and the spring 53 is twisted and keeps elastic restoring force and the curtain moving shaft 24 is positioned at the upper portions of the guide rail 20.

In this state, when a switch (not shown) is operated to supply power to the motor 30 and operate the motor forward, the wires 32 are wound on the rotary shaft of the motor and pull down the lifting blocks 26, the lifting blocks 26 compress the moving shaft springs 29 and move down along the guide rails 20, and the curtain moving shaft 24 integrated with the lifting blocks 26 is also moved down. The rotary pipe 52 is rotated in the opposite direction by the elastic restoring force of the spring 53 and the tension wires 57 pull up the curtain support bar 42 of the screen-type curtain 40.

The screen-type curtain 40 is moved to cover the door glass by the tension (i.e., elastic restoring force) applied by the curtain tensioner 50. Accordingly, even if external force, such as wind from outside of the vehicle, is applied to the screen-type curtain, the curtain can be kept taut and stably cover the door glass by the tension that is continuously applied to the screen-type curtain 40.

Moving-Down of Screen-Type Curtain

When the switch (not shown) is operated to supply power to the motor 30 and operate the motor 30 backward, the wires 32 are unrolled from the rotary shaft of the motor, and the moving shaft springs 29 apply elastic restoring force, which is larger than the tension applied by the curtain tensioner 50, to the lifting blocks 26.

As a result, the lifting blocks 26 are moved up along the guide rails 20 by the elastic restoring force of the moving shaft springs 29, and the curtain moving shaft 24 is also moved up. Then, the screen-type curtain 40 is accordingly moved down to the initial position (inside the door pane).

Accordingly, in view of the embodiments of the present disclosure, it is possible to make a curtain for covering a door glass in a screen-type blind structure that can be automatically moved up/down while tension is applied to the curtain using a motor and tension of a spring. Moreover, since tension is applied to the screen-type curtain, it is possible to keep the curtain taut and stably covering a door glass even if external force is applied.

The disclosure has been described in detail with reference to embodiments thereof. However, it will be appreciated by those skilled in the art that the scope of the present disclosure is not limited to the embodiments as mentioned above and that changes may be made in these embodiments without departing from the principles and spirit of the disclosure, the scope of which is defined in the appended claims and their equivalents.

What is claimed is:

1. An electric door curtain for a vehicle, comprising:
   guide rails disposed at both sides of a door panel of the vehicle;
   a curtain guide fixing shaft fixed to lower ends of the guide rails;

a curtain moving shaft disposed upside of the curtain guide fixing shaft, coupled to the guide rails, and configured to move up and down;

a motor equipped in the door panel, connected to the curtain moving shaft to supply power thereto, and supplying power to the curtain moving shaft to cause the curtain moving shaft to move up and down;

a screen curtain with a lower end that is fixed to the curtain moving shaft and wound on the curtain guide fixing shaft and with an upper end that is connected to a curtain support bar; and a curtain tensioner disposed in a door glass frame at a top of the door panel, coupled to the curtain support bar, and pulling the screen curtain with a particular tension to keep the screen curtain taut.

2. The electric door curtain of claim 1, further comprising:
lifting blocks disposed on the curtain moving shaft and having guide holes formed therein,
wherein the lifting blocks are integrally coupled to both ends of the curtain moving shaft, and the guide rails are inserted into the guide holes of the lifting blocks.

3. The electric door curtain of claim 2, further comprising:
spring support ends integrally formed at predetermined positions on the guide rails; and
moving shaft springs fitted on the guide rails between the spring support ends and the lifting blocks, the moving shaft springs configured to be compressed.

4. The electric door curtain of claim 2, further comprising:
at least one of the wires having one end connected to at least one of the lifting blocks on the curtain moving shaft and another end connected to a rotary shaft of the motor, the wire configured to be rolled and unrolled.

5. The electric door curtain of claim 1, wherein the curtain tensioner includes:
a fixing pipe fixed in a top frame of the door glass frame;
a rotary pipe rotatably disposed inside the fixing pipe;
a spring disposed between the fixing pipe and the rotary pipe and generating elastic restoring force when the rotary pipe is rotated;
a first pulley and a second pulley disposed at both ends, respectively, of the rotary pipe protruding through both open ends of the fixing pipe; and
tension wires having upper ends connected to the first pulley and the second pulley, respectively, configured to be rolled and unrolled, and having lower ends connected to the curtain support bar configured to apply tension.

6. The electric door curtain of claim 5, wherein the first pulley and the second pulley have respective diameters which differ from each other based on a height difference between front and rear sections of the top frame.

7. The electric door curtain of claim 5, further comprising:
bearings rotatably supporting the rotary pipe disposed at both ends in the fixing pipe.

8. The electric door curtain of claim 5, wherein the tension wires are made of a flexible material, disposed in vertical frames of the door glass frame, and configured to be moved up and down.

9. The electric door curtain of claim 1, further comprising:
a slide bar disposed in the curtain support bar and configured to be inserted and drawn out from one or both sides of the curtain support bar; and
connection blocks connected to tension wires and to ends of the slide bar.

10. The door curtain of claim 9, wherein the connection blocks are disposed in a vertical frame of the door glass frame and configured to be moved up and down, and guide holes for up-down movement of the slide bar are formed through an inner side of the vertical frame.

* * * * *